United States Patent
Meizlish et al.

(10) Patent No.: US 11,953,343 B2
(45) Date of Patent: Apr. 9, 2024

(54) PACKAGED SENSOR PAD

(71) Applicant: Marcy Enterprises, Inc., Columbus, OH (US)

(72) Inventors: Steven R. Meizlish, Bexley, OH (US); David W. Robinson, Worthington, OH (US)

(73) Assignee: Marcy Enterprises, Inc., Columbus, OH (US)

(*) Notice: Subject to any disclaimer, the term of this patent is extended or adjusted under 35 U.S.C. 154(b) by 949 days.

(21) Appl. No.: 16/629,198

(22) PCT Filed: Jul. 6, 2018

(86) PCT No.: PCT/US2018/041057
§ 371 (c)(1),
(2) Date: Jan. 7, 2020

(87) PCT Pub. No.: WO2019/010397
PCT Pub. Date: Jan. 10, 2019

(65) Prior Publication Data
US 2020/0132519 A1  Apr. 30, 2020

Related U.S. Application Data

(60) Provisional application No. 62/529,803, filed on Jul. 7, 2017.

(51) Int. Cl.
*G01D 11/24* (2006.01)
*B29C 39/00* (2006.01)
(Continued)

(52) U.S. Cl.
CPC .......... *G01D 11/245* (2013.01); *B29C 39/003* (2013.01); *B29C 39/10* (2013.01);
(Continued)

(58) Field of Classification Search
CPC ..... G01D 11/245; G01D 11/30; B60S 1/0822; B60S 1/0833; B60S 1/0881; B60S 1/0892;
(Continued)

(56) References Cited

U.S. PATENT DOCUMENTS

| 5,298,556 A * | 3/1994 | Stephens .............. C09D 183/04 524/588 |
| 8,459,460 B1 | 6/2013 | Hansen et al. |
| 2002/0155734 A1 | 10/2002 | Schaefer et al. |

FOREIGN PATENT DOCUMENTS

| EP | 1426256 A2 * | 6/2004 | ........... B60S 1/0822 |
| JP | 04216911 | 8/1992 | |

(Continued)

OTHER PUBLICATIONS

European Patent Office, International Search Report and Written Opinion in PCT Application No. PCT/US2018/041057, dated Oct. 29, 2018 (19 pgs.).

(Continued)

*Primary Examiner* — Benjamin R Schmitt
(74) *Attorney, Agent, or Firm* — Wood Herron & Evans LLP (57) ABSTRACT

A product [11] includes a foldable clamshell-type housing [10] folded to a closed position to contain a pre-formed sensor pad [17] that was formed in situ therein when the housing [10] was in an open position, prior to closing. The housing [10] has an enclosed volume [12] bounded by relatively thin and flexible walls [23, 34], and outwardly extending tabs [18] which facilitate opening. This structure enables the user to easily open the housing [10] to remove the sensor pad [17], a cured silicone composition, by pushing inward on an outer surface of the outer wall [34] of a base section [15] of the housing [10]. This product [11] reduces the amount of manipulation needed to place the (Continued)

sensor pad [17] in a desired position, for example, during installation of a rain sensor system for a vehicle windshield.

12 Claims, 7 Drawing Sheets (51) Int. Cl.
| | |
|---|---|
| *B29C 39/10* | (2006.01) |
| *B29C 39/26* | (2006.01) |
| *B29C 51/10* | (2006.01) |
| *B60S 1/08* | (2006.01) |
| *B65D 75/22* | (2006.01) |
| *B29K 83/00* | (2006.01) |
| *B29K 105/00* | (2006.01) |
| *B29L 31/00* | (2006.01) |

(52) U.S. Cl.
CPC ............. *B29C 39/26* (2013.01); *B29C 51/10* (2013.01); *B60S 1/0822* (2013.01); *B60S 1/0833* (2013.01); *B60S 1/0881* (2013.01); *B65D 75/22* (2013.01); *B29K 2083/00* (2013.01); *B29K 2105/0061* (2013.01); *B29L 2031/712* (2013.01); *B29L 2031/752* (2013.01); *B60S 1/0892* (2013.01); *B65D 2575/58* (2013.01)

(58) Field of Classification Search
CPC ..... B60S 1/0888; B29C 39/003; B29C 39/10; B29C 39/26; B29K 2083/00; B29K 2105/0061; B29L 2031/752
See application file for complete search history.

(56) References Cited

FOREIGN PATENT DOCUMENTS

| WO | WO-2004060730 A1 * | 7/2004 | ............ B60S 1/0822 |
|---|---|---|---|
| WO | 2008016612 A1 | 2/2008 | |
| WO | WO-2016169870 A2 * | 10/2016 | ............ B26F 1/3846 |

OTHER PUBLICATIONS

Anonymous: Clamshell Manufacturers: Clamshell Information, retrieved from the Internet: URL:https:/web.archive.org/web/20151120015211/ https://www.vacuumformedplastics.com/clamshells.

* cited by examiner

FIG. 5

PACKAGED SENSOR PAD

This application claims priority, under Section 371 and/or as a continuation under Section 120, to PCT Application No. PCT/US2018/041057, filed on Jul. 6, 2018, which claims priority to U.S. Provisional Application No. 62/529,803, filed on Jul. 7, 2017.

FIELD OF THE INVENTION

This invention relates to silicone sensor pads used with vehicle sensor systems, e.g., rain detector systems for vehicle windshields, and more particularly, to an individually produced and packaged sensor pad which facilitates the aftermarket installation and use of such systems.

BACKGROUND OF THE INVENTION

Many motor vehicles now utilize rain sensors and Advanced Driver-Assistance Systems, or ADAS, to help the driver operate the vehicle. These systems employ a variety of sensors, many of which utilize an optical silicone medium. In the case of rain sensor systems, automatic activation occurs via a rain detector mounted to the inside surface of the windshield, typically where the driver's rearview mirror mounts to the windshield. The rain detector operatively connects to the electrical controls of the windshield wipers. When the rain detector detects rain on the windshield, it initiates a signal that is sent to the electrical controller to turn on the windshield wipers.

This automatic windshield wiper activation feature is supplied on new vehicles during manufacturing. If the vehicle becomes involved in a collision, or some other event which causes the windshield to require replacement, it is expected that this operational feature will be retained on the replacement windshield.

According to one current rain sensor technology, the rain detector uses an electronic device which typically includes at least one transmitter utilizing infrared light, and at least one receiver. Both are fixedly mounted within a housing, such that they are spaced a desired distance from the inside surface of the windshield. This electronic device may employ an array of infrared transmitter and receiver pairs. A light-conductive medium resides between the mounted IR transmitters/receivers and the windshield. When the IR transmitter sends an IR signal toward the windshield, it passes through the medium and also through the windshield, whereupon it is reflected back through the windshield and the medium and then eventually to its corresponding IR receiver.

When the outside surface of the windshield is dry, the reflected signal will have a magnitude and/or angle characteristics which correspond to dry conditions outside the vehicle. On the other hand, when the outside surface of the windshield is wet, for example when it rains, the reflected signal will differ so as to correspond to wet outside conditions. In other words, the characteristics of the reflected signals, upon receipt by the electronic device, determine whether the device should signal to the electrical controller to activate the windshield wipers.

This is a very basic description of this rain sensor technology. It is generally consistent with the description found in www.windshieidsurgeons.com However, there are various types of rain sensors, and various accompanying housing structures to which electronic IR transmitter/receiver packages may be mounted.

The present invention does not specifically relate to the electronic devices or the structures used to mount such devices, but instead relates to the light conductive medium which resides between the electronic device and the inside surface of the windshield. Also, the present invention is adaptable to a number of different types of vehicle sensor systems, e.g., rain sensors or ADAS, which employ a light conductive medium.

To enable these types of sensors to function in an optimum manner, the transmission medium must fully fill or occupy the space, i.e. the otherwise open volume, that resides, e.g., between the windshield and the electronic device, and must do so in a manner in which there are no air pockets within this space. Moreover, the medium must be uniformly consistent in light transmissivity, or conductivity, within this space. Further, the medium must maintain these consistent performance characteristics over an extended time period, and over a relatively wide range of temperature and humidity fluctuations. Still further, the characteristics of the medium must be repeatable so as to accommodate circumstances, e.g., wherein a windshield for a vehicle must be replaced, perhaps due to an accident.

As noted above, when an original vehicle windshield needs to be replaced, and the original windshield had a rain sensor unit, the existing original rain sensor unit is typically re-used, if possible, due to relatively high cost of the rain sensor unit. In contrast, a new replacement pad is used with the original rain sensor unit.

One type of rain sensor pad is a pre-formed transparent acrylic pad with a liner on each of its oppositely directed surfaces. On each of these surfaces, removal of the liner exposes a layer of adhesive which enables the pad to adhere to an adjacent surface, either the inside surface of the windshield or the rest of the rain sensor structure.

Such pads are typically die cut from a large sheet of acrylic, to a desired shape, and then packaged individually for shipment to distributors of aftermarket windshields and/or end-users. There are a number of standard shapes and sizes that are commonly used in the motor vehicle industry.

For such pads, the die cutting step represents some inherent waste of material, because eventually some amount of the sheet remains unused, and is typically discarded. Also, the step of individually packaging each pre-formed pad represents an additional cost. Still further, the retrieval of each pre-formed pad from the individual package requires some amount of human manipulation with respect to both the pad itself and the corresponding liners and external package. This includes removing the liners, and then placing the pad inside the sensor receptacle. But too much handling of the pads can adversely affect the light conductivity of the pad, for instance by inadvertent smudging from human fingerprints or damaging the pad itself.

U.S. Pat. No. 6,581,484, entitled "Sensor Joined To a Glass Pane With a Silicone Gel" is incorporated by reference herein, in its entirety. In describing the prior art of that time, namely the use of transparent adhesive tape and an acrylic foam, this patent explains that the acrylic foam is susceptible to yellowing and hardening during long term temperature tests, such as test at 100 degrees F.°. As a solution, this '484 patent discloses the use of a silicone gel that remains soft. This gel provides advantages in that it is not susceptible to degradation from heat. It will not permanently enclose air bubbles. And it can reduce stress between the windshield and the other components of the sensor.

One aspect of the teachings of the '484 patent, namely, the use of a silicone gel medium, has been adopted in the market in the context of rain sensor systems, but with some variation. More specifically, it is now possible to use a gel-type medium that can be dispensed manually via a syringe, into a desired location of a sensor system. Several types of such gel are commercially available, including the AUTOVER SENSOR INSTANT PAD, or applicant's own Quick Cure Sensor Gel. The use of such gels, manually delivered via a syringe, has increased the capabilities of aftermarket suppliers to provide necessary materials for the replacement of windshields equipped with rain sensor systems. This is due to the recognition that a gel, and particularly a silicone gel, has the capability of readily filling the space between the internal surface of a windshield and a rain sensor, with no material air bubbles and only a minimum amount of wasted gel. However, contrary to the gel-type substance that is disclosed in the '484 patent, which remains in gel form at the time of installation and during use thereafter, the current commercially available gels are designed to substantially cure prior to installation. This allows the resulting sensor lens to be handled and placed with ease and little risk of disturbing and damaging the silicone medium.

The currently available silicone gel products typically are supplied in a two-part liquid form, which can be delivered via syringe, to a desired space so as to completely fill the desired space, or volume. Subsequent curing of the silicone results in a cured, pliable silicone medium which fully occupies the space between the windshield and the rain sensor.

With these two-part gel products, the mounting arrangement relies on other mechanisms for securing the rain sensor to the windshield, such that the cured gel pad does not perform that function, i.e., it is not adhered, as were the prior acrylic pads. Nevertheless, the composition of the silicone gel is such that it tends to adhere readily to, and to remain adhered to, certain types of surfaces, such as the inside surface of a glass windshield.

Unfortunately, this currently available gel-type approach has a significant disadvantage in that it takes a relatively long time for the sensor pad to cure. For instance, the typical cure time can be anywhere from 4-60 minutes, depending on the specific gel used and the ambient conditions. This relatively long cure time reduces the overall efficiency of the glass technician performing the windshield installation. And this is even more problematic in low temperature conditions. One option for addressing the relatively long cure time, particularly in colder temperatures, is to use a heating box to accelerate curing. However, this adds a time consuming step to the process, and additional equipment costs, without necessarily assuring uniformity in the quality of the resulting pads.

As a result of these and other factors, and due to their ease of use, in recent years pre-formed silicone sensor pads have become more prevalent in the industry. One example of this type of sensor pad is the ICOR brand pad. The increased use of preformed silicone sensor pads may be due to the increased perception that a pre-formed silicone pad generally provides all of the advantages of the above-described gel-type solution, but in addition also serves as a ready to use gasket. As such, the end-user, i.e., the installer, does not need to dispense the gel to a particular space with dimensional requirements, or to wait during the necessary curing time after dispensing. Rather, the installer merely retrieves the pad from the corresponding package and places it in the desired location.

However, the currently available pre-formed silicone sensor pads suffer from the same disadvantages that are described above with respect to the pre-formed acrylic pads. That is, they are typically die-cut from a large sheet, a process which still represents some inherent degree of wasted material. Also, after die-cutting, they are then individually packaged, which also represents a cost. Still further, the end-user must retrieve each pre-formed pad from the corresponding package and then place it in a desired location. In addition to adding cost, these steps will inevitably cause some degree of hand contact with the pad surfaces, which can adversely affect performance.

As representative of the current state of the art, applicant cites the following references, and incorporates each by reference herein, in its entirety: U.S. Pat. Nos. 7,236,249; 8,269,202; 8,339,453; 8,448,914; 9,120,464; U.S. Patent Publication No. 2007/0235638; a two-page publication by Saint-Gobain Autover which explains the Autover sensor gel, sensor pad, and sensor instant pad; an eight-page publication entitled "ICOR Automatically Perfect; "Sensors, Sensor Holders & Adhesives;" and also several pages taken from Marcy's current product catalog, which shows rain sensor pads. These latter non-patent references are included in U.S. Provisional Application Ser. No. 62/529,803, filed on Jul. 8, 2017, which is expressly incorporated herein, in its entirety.

It is one object of the present invention to reduce the cost of pre-formed sensor pads used with sensor systems, particularly rain sensor systems for vehicle windshields.

It is another object of this invention to assure the necessary uniformity and consistency in performance of these reduced cost, pre-formed sensor pads, particularly rain sensor pads used with rain sensor systems for vehicle windshields.

It is still another object of the invention to reduce the amount of waste generated during the manufacturing, the packaging, and the eventual use of pre-formed rain sensor pads, compared to currently conventional methods.

It is still another object of the invention to reduce the amount of human manipulation required to remove a pre-formed sensor pad from a corresponding package and to thereafter place the sensor pad in a desired location.

SUMMARY OF THE INVENTION

The present invention achieves these objects via a product, namely, a packaged sensor pad, wherein the pad has been formed in situ in a foldable clamshell-type package. The structural integrity and the pliability of the pad in combination with the flexibility of the package enable the pad to be removed from the package and placed in a desired location as one unitary piece. This product, i.e., a sensor pad formed in the package, minimizes the amount of human manipulation needed to remove the pad from the package and to install it in a desired location. Thus, this product reduces the likelihood of contaminating the outer surface of the pad, for instance, from human fingerprints. This packaged sensor pad is particularly suitable for use as an aftermarket sensor pad in vehicle sensor systems, e.g., rain sensor systems.

Compared to prior pre-formed pads, whether acrylic or silicone based, the present invention reduces the amount of, and hence the cost associated with, unused portions of the sheets from which the pads were die-cut. Instead, because the sensor pad of the present invention is formed in situ, with just the amount of material needed to fill the housing to a desired height, there is virtually no wasted pad material during manufacture. Also, the use of a flowable material, and in situ formation of the sensor pad, enables precise and consistent sizing of the cured pad, reducing the likelihood of air pockets in the installation process, thereby assuring uniformity and consistent performance of the resulting pad, once installed.

Moreover, because the making of the pad of this invention occurs in the clamshell-type housing, with the clamshell shape in an open position, there is no need for a separate step of individually packaging each of the die-cut pads. That packaging step has been eliminated, and the costs associated with that step have also been eliminated. This reduction in waste and elimination of unnecessary packaging steps helps to reduce the overall cost of producing a pre-formed vehicle sensor pad, e.g., a rain sensor pad for a vehicle windshield. Still further, the shape and the composition of the clamshell housing, particularly the thin and flexible walls, enable the already-formed sensor pad to be easily removed therefrom, requiring only minimal human hand contact. These advantages are particularly helpful in supplying appropriately shaped sensor pads for the automotive aftermarket, particularly when reinstalling an existing rain sensor system on a new windshield, and a new rain sensor pad is needed.

According to a preferred embodiment of the present invention, the foldable clamshell-type housing is formed by vacuum molding, to produce one unitary and integrally formed piece. Moreover, a plurality of housings, with the same or varied internal volumes, is preferably formed at one time on a template, or sheet, via a single vacuum molding procedure. This results in the vacuum molding of a plurality of side by side packages in one step, and the vacuum formed packages are also formed in a manner so as to be releasably removed from the sheet via score lines.

With a plurality of packages formed on a single sheet and held in the open position, each of the packages can be filled with silicone gel to a desired volume via a dispenser that is movable relative to the packages. After the filling of the packages, and after some initial amount of curing of the dispensed gel inside the open packages, each package can thereafter be removed from the sheet and then closed.

The sheet or template used to form the side by side, releasably held packages is preferably a transparent thermoplastic material, of uniform thickness, such as 0.10 gauge, and could be of polyvinyl chloride or "PVC," or recycled polyethylene terephthalate (RPET). Each of the housings is initially formed in an elongated, or open position, with two opposing sections foldable with respect to a connector. Once removed from the template, along the die cut lines, the sections are foldable to a closed position, to define an enclosed volume which will eventually hold the sensor pad. Preferably, the outer sections of the housing include outwardly extending tabs to facilitate opening and closing of the package.

For each of the housings, there is a base section with an upwardly directed open space, i.e. volume, which corresponds to the size of the sensor pad to be formed. This open space is preferably elevated relative to a bottom flange that resides in contact with a level support surface that supports the template. Liquid silicone, i.e. silicone gel, is caused to flow into this open space, to a desired horizontal level which corresponds to the desired thickness of the sensor pad. The volume of the gel that is flowed into the space is dictated by the desired shape of the resulting pad. This volume may be metered automatically, via an automated and/or programmable dispensing device, so as to assure repeatability for all of the types of sensor pads. Alternatively, the dispenser could be operatively connected to a sensor and a controller, with the sensor capable of sensing the specific volume to be filled, and then determining the amount of gel to be dispensed. The dispenser controller could even determine and then use a particular pattern associated with the shape of that base section.

Thereafter, the gel material is allowed to sufficiently cure, and then a cover section of the housing is closed over the base section to enclose the pad, preferably by folding relative to the connector. The two opposing sections of the housing are sized to provide a tight snap fit connection, to affirmatively assure that the housing remains closed until the pad is to be used. The product, i.e., the packaged sensor pad, can be shipped in this condition.

Preferably, with a plurality of packages formed on a sheet, or template, after an initial amount of cure time has lapsed from the time of dispensing, the package is removed from the sheet. Then the cover section is folded to cover and snap into the base section, to enclose the pad therein.

When the pad is to be used, for instance by installing it in a desired position on a windshield or within a component of a rain sensor system, the first step is to open the housing. This first step is facilitated by the outwardly extending tabs. Once the housing is in the open position, the user then maneuvers his/her fingers to the outer or external surface of the wall of the base section, so as to apply external force from outside the package, which results in movement of the pad out of the base section toward the desired location. Because of the flexibility of the housing and the structural integrity and the pliability of the pad, the pad moves easily from the base section while remaining as one unitary piece.

In order to achieve this feature, the composition of the silicone product was formulated to enhance the pad's structural integrity, while retaining a desired amount of pliability. In testing the present invention, applicant has learned that this combination of features, along with the use of a release agent within the inside surface of the base section of the housing, has proved suitable.

Those skilled in the art will more readily understand the details of the present invention, and the above-described advantages, when considered in the context of the accompanying drawings, which are briefly described in the next section and then described in more detail thereafter.

DETAILED DESCRIPTION OF THE DRAWINGS

The accompanying Figures, namely, FIGS. 1 and 2, 6 and 7, and 8 and 9, respectively, show three currently preferred embodiments of a foldable clamshell-type package, or housing, 10, 110, 210 according to the present invention, for three specific shapes of sensor pads, as defined by the volumes 12, 112, 212 located in the respective base sections 15, 115, 215 thereof. These three embodiments are intended to be exemplary. Those skilled in the art will appreciate that the specific shapes of the enclosed volumes can be modified, as desired, to achieve a specific pad shape that is desired. In other words, each of these Figures shows a housing 10, 110, 210 which has an enclosable volume that is shaped to achieve one of the known and more common shapes for rain sensor pads used in current vehicle rain sensor systems. To achieve other pad shapes, other housing shapes would be used. Most of the rest of this detailed description focuses on FIGS. 1-5, and the reference numbers relate to the first embodiment. However, those skilled in the art will understand that like numbers in the 100s and the 200s represent corresponding components for the second and third embodiments, as shown in FIGS. 6-9. This application incorporates by reference, in its entirety, U.S. Provisional Patent Application No. 62/529,803, filed on Jul. 7, 2017, entitled "Packaged Sensor Pad For A Vehicle Windshield."

As currently contemplated, the foldable clamshell-type housing 10 of the present invention has a number of features that are common to all shapes and sizes of resulting sensor pads (not shown). For instance, the opposing sections, i.e. the base or bottom section 15 and the cover, or top section 16 of the housing 10 includes outwardly extending tabs 18, each of which is preferably marked with instructional indicia (not shown). These tabs 18 enable the user to more easily open and close the housing 10 by relative movement, i.e., in this case by folding or unfolding along a connector 20, with the folding or unfolding occurring with respect to a hinge line that bisects the connector 20. Preferably, the foldable clamshell-type housing 10 is made by vacuum forming, out of a sheet of thermoplastic material. Applicant has vacuum formed the housing 10 of the present invention from a sheet of 0.10 gauge polyvinyl chloride. However, other suitably moldable materials could also be used, in sheet form, including recycled polyethylene terephthalate ("RPET"). If desired, the sheet may include one or more surface treatments or components to produce a desired effect, either during or after vacuum molding. The desired effect could be enhanced molding capability, or a desired aesthetic effect for the eventual package, or a desired surface quality of the package itself. Such surface treatments may be included to the sheet prior to vacuum forming. As a result, the housing 10 formed in this manner is a single unitary, and integrally formed piece, with two sections 15 and 16 and a connector 20 extending therebetween.

Additionally, after forming the housing 10, the inside surface of the base section 15 may be treated with a release agent so as to facilitate eventual removal of the cured sensor pad therefrom. Recall that this inside surface of the base section 15 defines the predetermined shape and thickness of the enclosable space 12 and hence the outer shape of the pad. Applicant has found that, with a housing made from PVC, a subsequent silicone coating proves sufficient, and that the silicone coating can be applied by spraying. But it is believed that other methods of applying the coating to the surface would also be suitable.

For all variations of the housing 10, a relatively large central wall 23 of the bottom section 15 is sufficiently thin and flexible so as to enable the user to push the outer or external surface thereof, i.e., the surface on the opposite side of the sensor pad held therein, to move the wall 23 and the pad in the desired direction, toward a location for installation. This central wall 23 is best seen in the cross-sectional views of FIGS. 3A, 3B and 3C. Also, as shown in these same Figures, the enclosable volume 12 preferably resides above, or is spaced from, a plane 30 in which the tabs 18 reside when the housing 10 is in the closed position. In this condition, there is preferably some amount of space 33, i.e. open volume, between an inside surface of the corresponding upper wall 34 of the cover section 16 and the top of the pad (shown in FIG. 3C only).

Although the currently preferred embodiment for the housing 10 includes the connector 20 that extends between the two foldable sections 15/16, and the sections 15/16 are foldable and unfoldable relative to a fold line 25 that bisects the connector 20, other structures could be used for achieving the open and closed positions needed to form the sensor pad (not shown) in situ within the enclosable space 12. Moreover, even if the connector 20 were to break, the housing 10 itself would still be usable for its intended purpose, that of serving as a package for the sensor pad.

Figure 1:
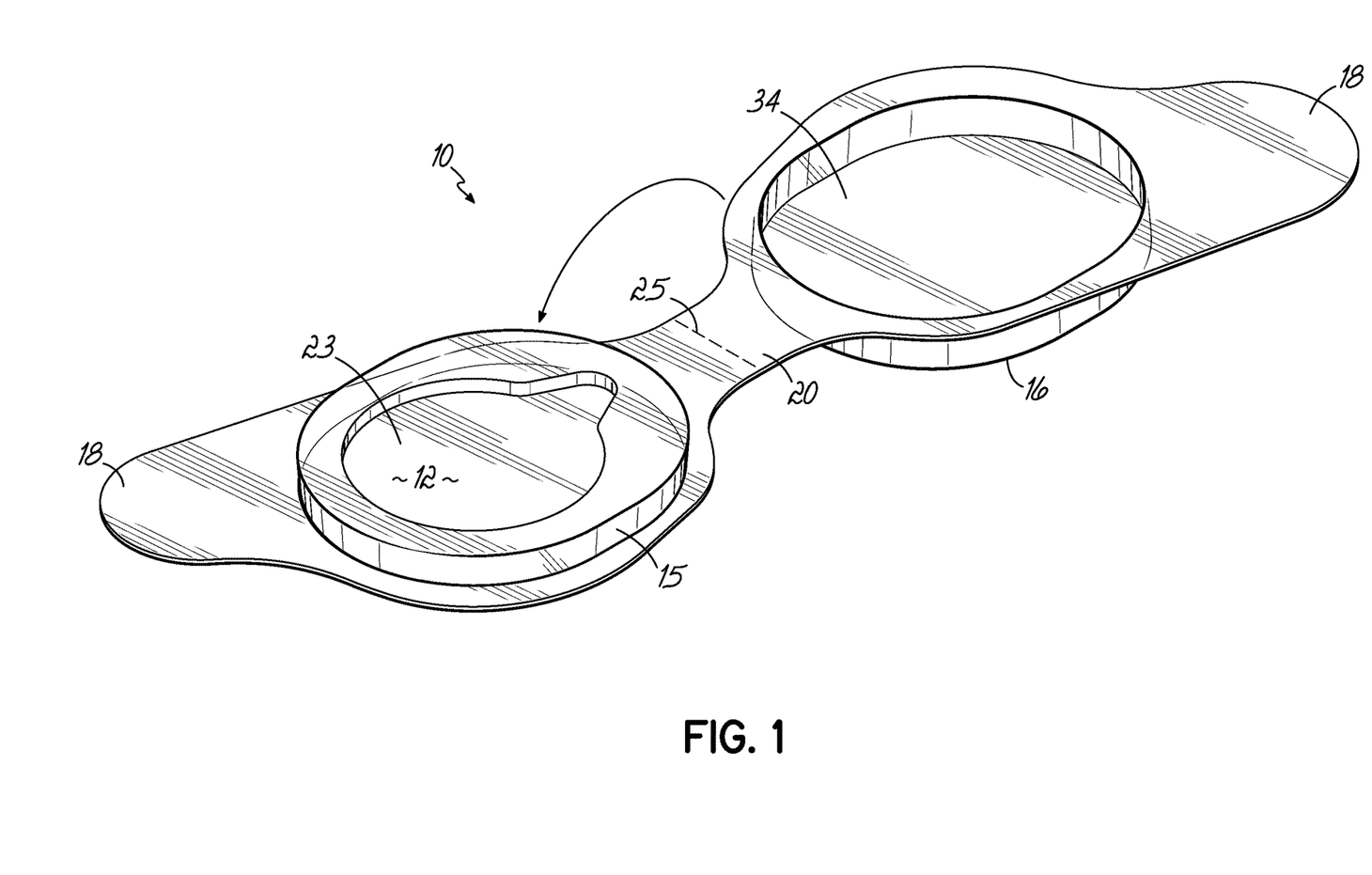
FIG. 1 is a perspective view of a clamshell-type package for a sensor pad according to a first preferred embodiment of the invention, with the package in an open position.
Figure 2:
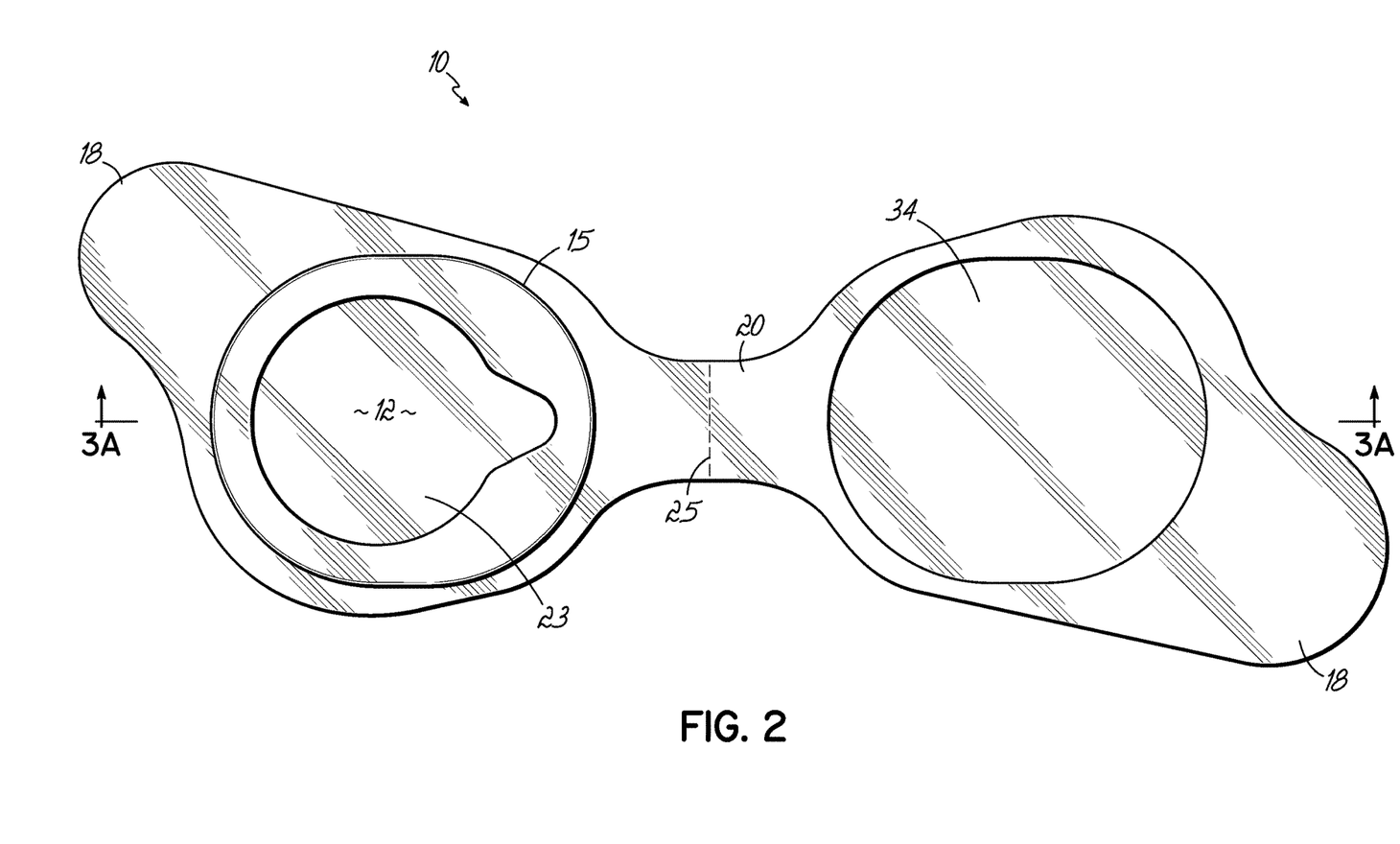
FIG. 2 is a top view of the clamshell-type package shown in FIG. 1.
Figure 3A:
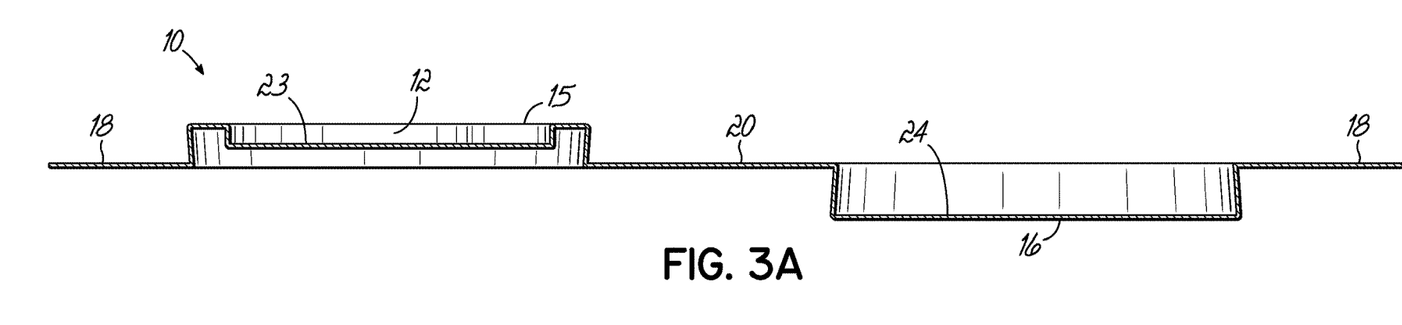
FIG. 3A is a cross-sectional view taken along lines 3A-3A of FIG. 2.
Figure 3B:
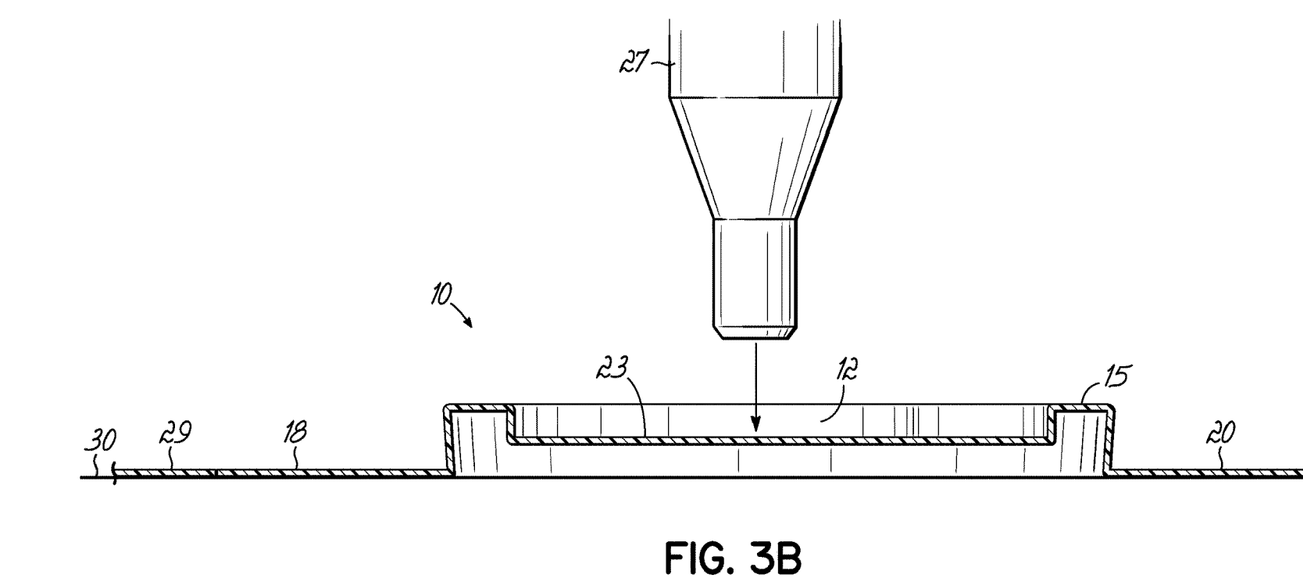
FIG. 3B is a cross-sectional view, similar to FIG. 3A, of the base section of the package located below a nozzle, for dispensing the liquid silicone gel into the housing.
Figure 3C:
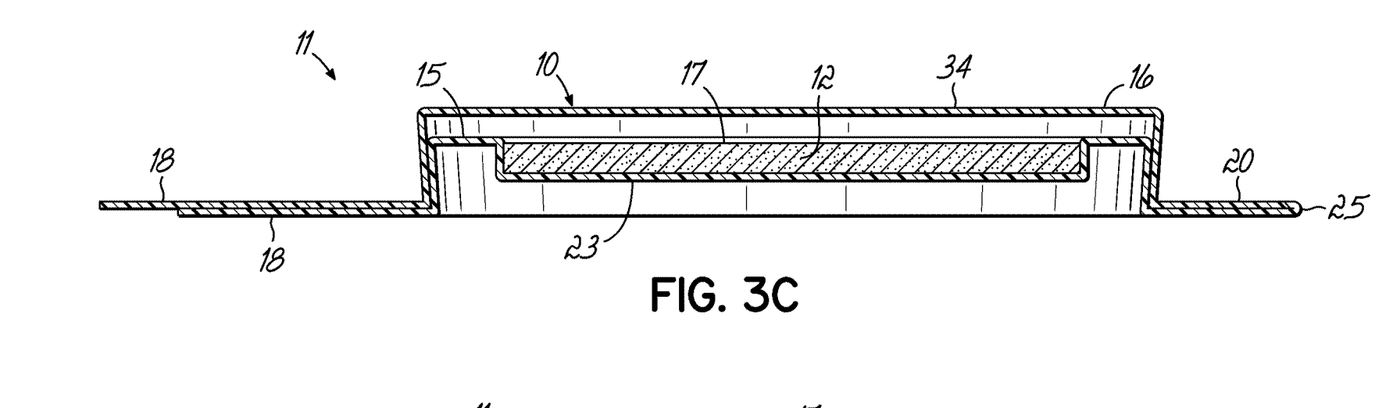
FIG. 3C is a cross-sectional view, similar to FIGS. 3A and 3B, but with the gel already cured to form an in situ pad, and the package in a closed position.
Figure 4:
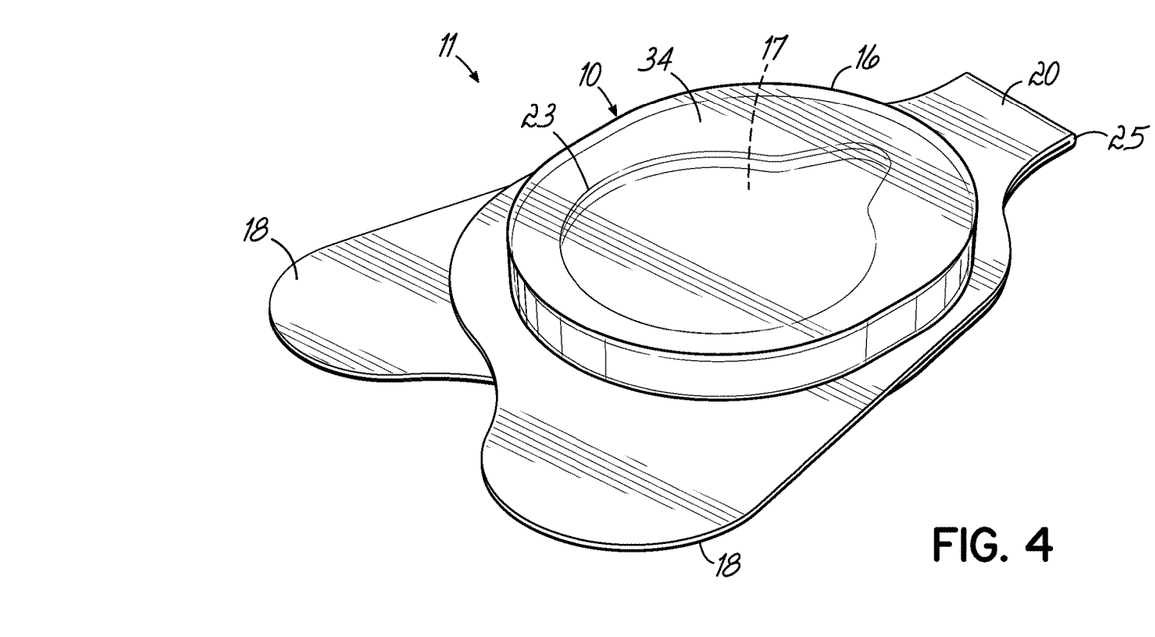
FIG. 4 is a perspective view of the clamshell-type package of FIG. 1, but in a closed position.

FIGS. 1, 2, 3A and 3B show the open position of the housing 10. This is the position of, or the operable mode of, the housing 10 when the volume 12 is filled with a desired and/or predetermined amount of silicone gel in liquid form. FIG. 3A shows a dispenser nozzle 27 located above the base section 15, with the housing 10 in the open position. Applicant expects that there may be any one of a number of combinations of nozzle 27 and silicone gel composition that could prove suitable for the present invention, depending on the circumstances and the particular application. One particular combination that applicant currently believes to be suitable is a two part room temperature cured silicone gel, with a static mixer as the nozzle 27. Nonetheless, those skilled in the art will recognize that other combinations could prove to be equally suitable, or perhaps even more suitable. Moreover, as described previously, current commercially available formulations of silicone gel are not suitable for forming a pad that is retrievable from such a package as a single unitary piece. In fact, applicant believes that if any of the current commercially available gel products were to be tried in combination with the housing 10 of the present invention, it is highly likely that the user would need to wait an extended period of time for the gel to cure. And even after curing, it is doubtful that the material retrieved from the bottom section 15, would still be a usable unitary piece. FIG. 3C shows the dispensed, or casted, gel after it has cured in volume 12 to form a pad 17, and after the lid section 16 has been closed.

When closed, the sections 15, 16 of the package form a relatively air tight seal, via a compression fit, to prevent moisture ingress. As shown in FIG. 3C, when the housing 17 is closed, there is a uniformly thick open space between pad 17 and the wall 34 of the top section 16. This open space enables an upper surface of the pad 17 to cure completely, without any further physical contact, thereby to produce the product 11 of the present invention, a pad 17 within a package 10.

In contrast, with the present invention the volume 12 is filled with the silicone gel when the package 10 is in an open position, to a level near to the top of the base section 15. After the casted silicone gel has cured, in situ, in the volume 12, the result is a sensor pad 17 residing therein. At that point, or after most of the curing has occurred, the lid section 16 is closed, as shown in FIG. 3C, thereby to enclose the pad 17 within the volume 12 of the housing 10. The housing 10 serves as the package for the pad 17. Notably, the housing/pad 10/17 combination may be shipped to and received at the site of an end-user, i.e. the aftermarket windshield installer, but at that point the pad 17 has not yet been touched by human hands. As best shown in FIG. 3C, once the dispensed gel material has cured within the base section 15, and the cover section 16 has been moved to a closed position to enclose the volume 12 with the pad 17 held therein, there is preferably some amount of open volume 33 between the inside surface of the wall 34 of the cover section 15 and the top of the pad 17.

As generally described herein, each of the foldable clamshell-type housing 10, 110, 210 shown in these Figures is used to form one specifically shaped sensor pad 17, 117, 217 that is commonly used as a rain sensor. For each additional pad shape, there would be a need for a corresponding specific housing, perhaps with different external dimensions, but certainly with a different internal volume. Nevertheless, to enhance the convenience of the use of such sensor pads 17, 117, 217, and to achieve cost savings with respect to producing these sensor pads in significant numbers, it is further contemplated that these housings 10, 110, 210 will be used in a coordinated manner, i.e. used in a production line that is capable of manufacturing high numbers of sensor pads 17 in assembly line fashion at a production site. In this context, it is expected that the gel material will be dispensed into the volume 12, 112, 212 via an automated dispenser with suitable controls, to move a nozzle 27 thereof generally above a base section 15, 115, 215 of the housing 10, 110, 210, to dispense the material therein, and to then move the nozzle relative to another housing 10, 110, 210, so as to thereafter dispense material into the next base section 15, 115, 215, and so on. Again, FIG. 5 generally shows this concept, but with respect to housing 10.

Figure 5:
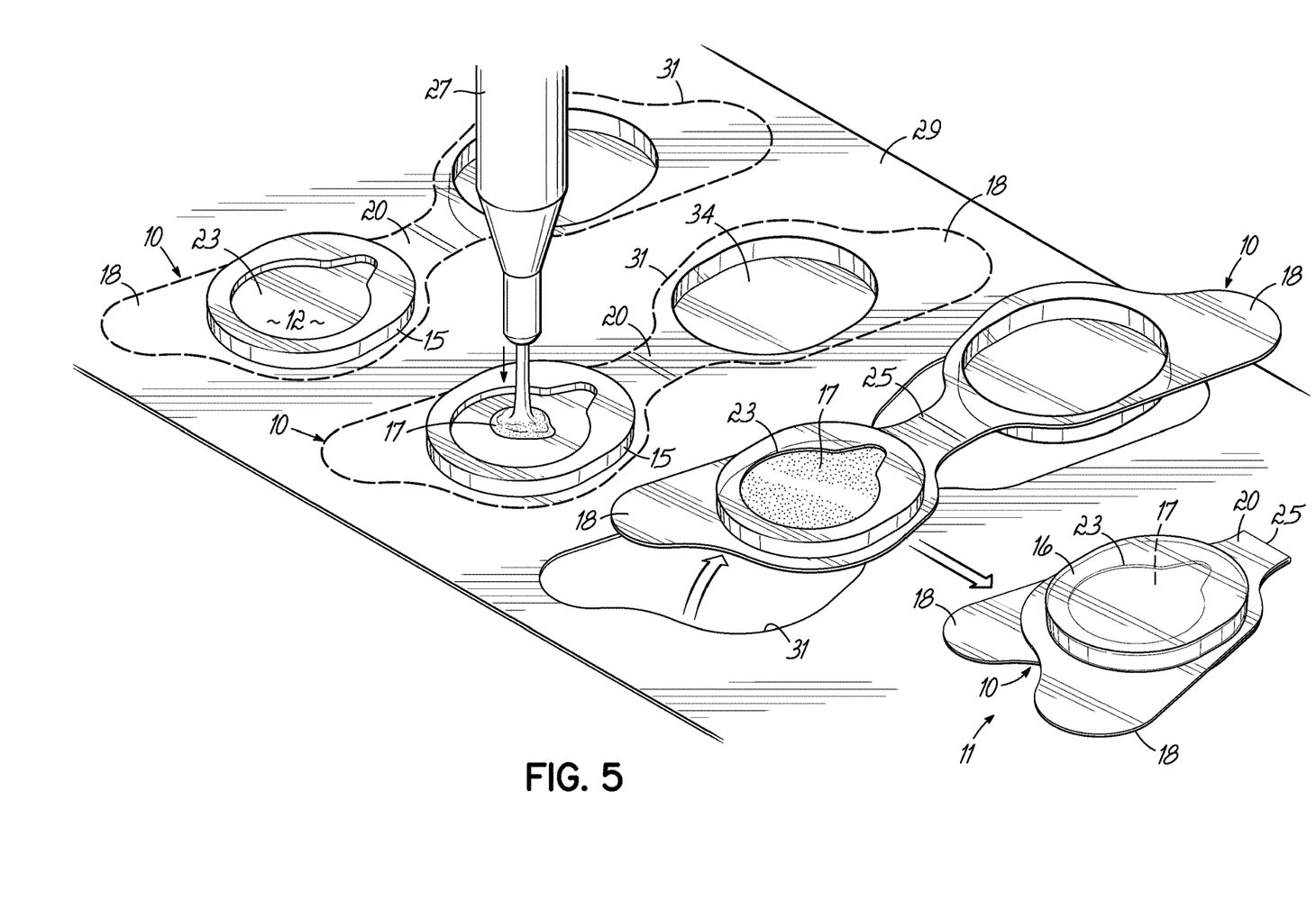
FIG. 5 is a perspective view which shows one exemplary manner for automatically producing sensor pads of the present invention, with a relatively movable automated dispensing nozzle, or head, arranged so as to programmably dispense a predetermined amount of the sensor pad material, in liquid or gel form, successively into the base sections of a plurality of clamshell-type packages that are in the open position, as the housings are moved, in relative fashion, under the dispensing head.
Figures 6, 7:
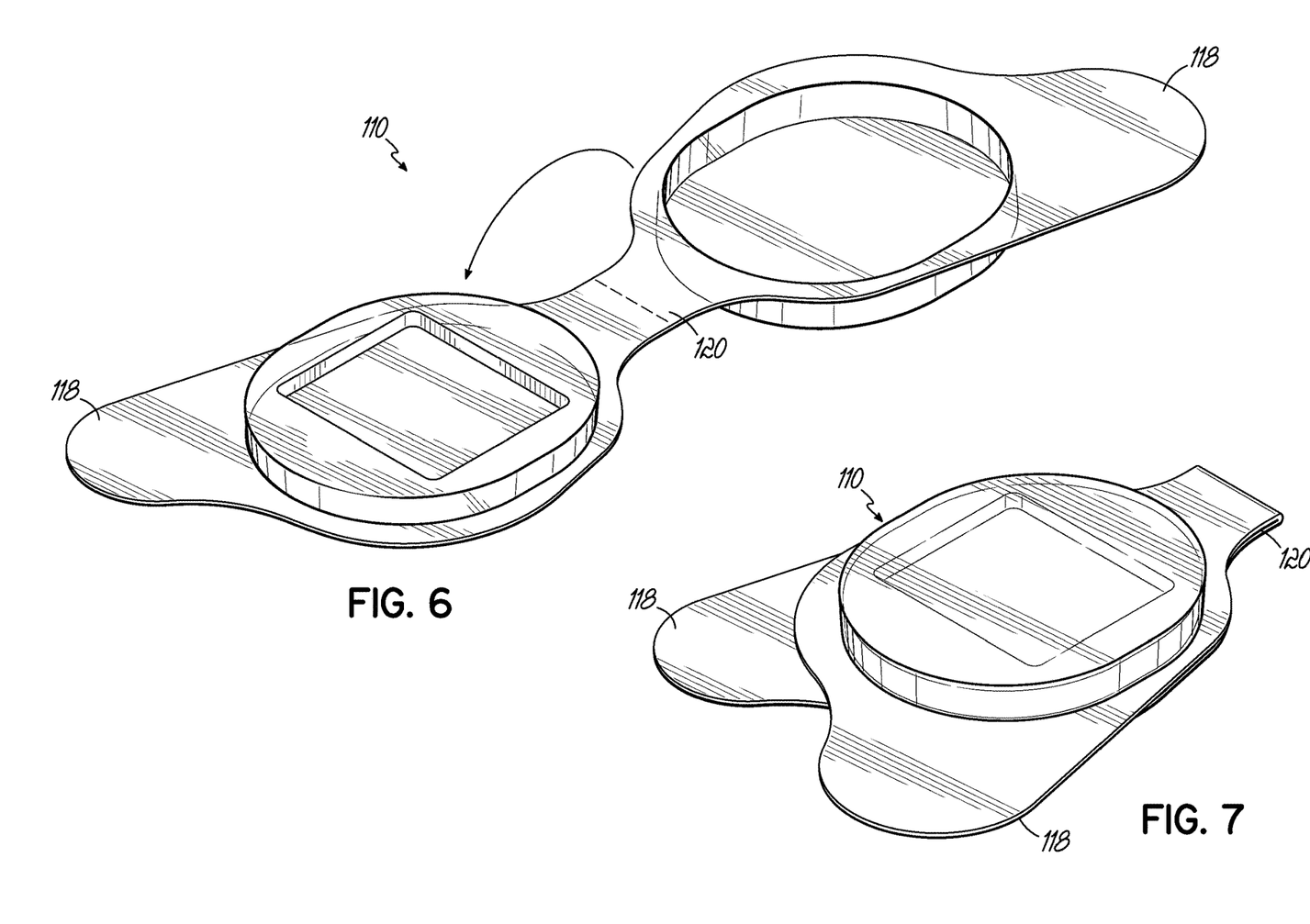
FIG. 6 is a perspective view of a clamshell-type package for a sensor pad according to a second preferred embodiment of the invention, with the package in an open position, and the package adapted for use in producing a differently shaped sensor pad.
FIG. 7 is a perspective view of the clamshell-type package for a sensor pad shown in FIG. 6, but with the package in a closed position.
Figures 8, 9:
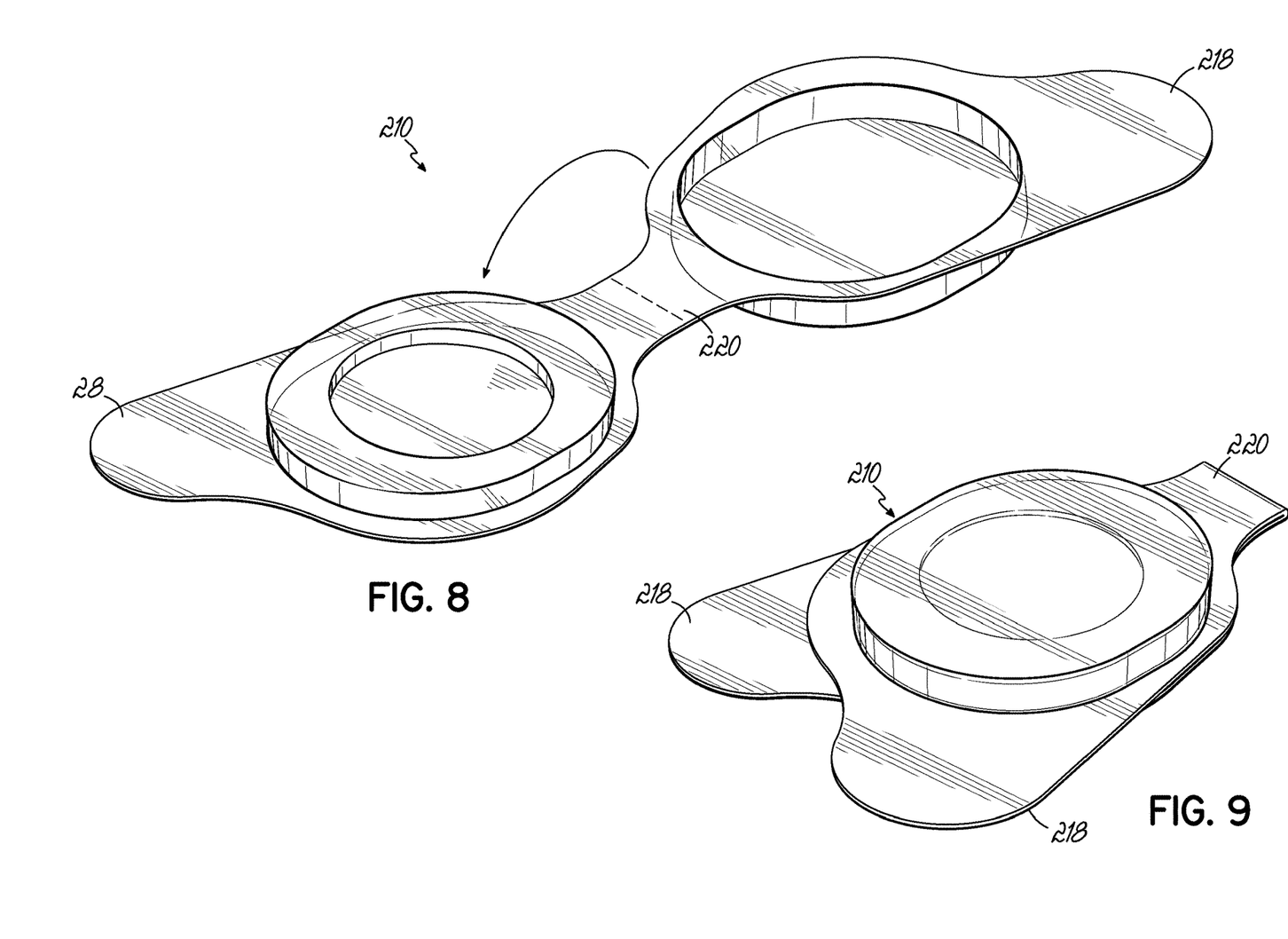
FIG. 8 is a perspective view of a clamshell-type package for a sensor pad according to a third preferred embodiment of the present invention, with the package in an open position, and the package adapted for use in producing another differently shaped sensor pad.
FIG. 9 is a perspective view of the clamshell-type package for a sensor pad shown in FIG. 8, but with the package in a closed position.

More specifically, FIG. 5 shows one preferred manner for mass producing the pad 17 in the package 10, i.e., the combination of the present invention. Similar to FIG. 3B, FIG. 5 shows a nozzle 27 located directly above a housing 10. But in addition, FIG. 5 also shows a plurality of housings 10 located alongside one another, to facilitate dispensing from the nozzle 27 as the housings 10 are moved relative thereto. In FIG. 5, a plurality of the housings 10 reside alongside one another on a template 29, as a result of having been simultaneously vacuum-formed on a single sheet of suitable material. FIG. 5 shows a plurality of housings 10 sized and shaped to form one particular type of pad 17. However, different housing types, and hence different pad 17 shapes, can be made from one single sheet.

Prior to forming a sensor pad within the clamshell-type housing 10, the housing 10 is preferably clean and dry. If forming of the sensor pads 17 of the present invention is to occur at a site that differs from the site of production of the housings 10, then the housings 10 need to be shipped to the site of pad manufacture, in sheet form with the housings 10 releasably attached thereto and held in the open condition.

For these and other reasons that relate to optimizing the benefits of this inventive clamshell-type housing 10 for in situ forming of sensor pads 17, the composition of the silicone gel used to form the pad 17 was formulated so as to enable the pad 17 to move easily from the package 10, 110, 210 as a unitary piece. Compared to applicant's current commercially available silicone gel, Quick Cure, there was a need to modify the existing silicone gel composition so as to enhance the structural integrity, once cured, while still retaining a sufficient amount of pliability. There was also a secondary desire to have the silicone gel cure relatively quickly, so as to preferably achieve the needed firmness within several minutes after dispensing. Via several tests on various iterations of the silicone gel, applicant was able to arrive at a suitable composition. Preferably, once cured, the pad 17 of the present invention has a hardness of about 10 on the Shore A scale (Shore 0060). Based on evaluations of the performance of the pad 17, applicant has arrived at an appropriate balance of the various relevant considerations, with a resulting pad composition that should prove suitable for use as a sensor pad, on a vehicle windshield as a rain sensor pad. Nonetheless, applicant also believes that other variations of the gel composition may prove to be equally suitable, depending on the parameters that are deemed to be the most important, so long as such variations achieve the desired degree of transmissivity, uniformity in shape, consistency, and pliability.

Moreover, the pad 17 of the present invention cures within a relatively short time window. In practical terms, this means that the pad 17 cures more quickly than the currently commercially available Quick Cure product, which typically cures anywhere from 4 to 60 minutes in ambient conditions. But it is not applicant's intent to achieve a specific cure time, or the absolute fastest cure time suitable for mass production. Rather, applicant has focused on achieving a pad 17 that provides optimal performance characteristics, and which does so at a considerable cost savings compared to the currently available pads.

Also, applicant expects that there may be further improvements and/or refinements with respect to the details of mass producing the pad 17 and the package 10 at the lowest reasonable cost, and that such improvements and/or refinements may depend on the particular application involved, or possibly other circumstances. Nonetheless, applicant's present disclosure focuses primarily on performance, and the characteristics needed to supply a product, i.e., a pad formed in situ in a package, that represents a significant improvement over current commercially available products.

This specification describes several preferred embodiments of the present invention, and specifically a rain sensor pad usable with a vehicle windshield rain sensor system. But those skilled in the art will understand and appreciate that the sensor pads disclosed herein may be applicable for other sensor systems, including vehicle sensing systems which sense conditions other than precipitation on a vehicle windshield. Moreover, those skilled in the art will also understand that the accompanying Figures and the detailed description are exemplary in nature, and not intended to be used to limit the scope of the following claims. Still further, this specification refers to various "objects" of the invention in order to help explain the deficiencies of the current state of the art, and to more fully encompass the benefits of the present invention over current sensor pad products, and current methods for making those products. This manner of explaining the benefits of the present invention is not intended to require that every claim achieve every one of the above-described objects.

We claim:

1. A product comprising:
a foldover clamshell-type housing, the housing having opposing base and cover sections that are relatively movable between an open position and a closed position, with the closed position defining an enclosed volume of predetermined shape;
a unitary cast silicone gel sensor pad produced in situ, having been cured within and residing within the base section, the sensor pad being of relatively uniform thickness and having an outer perimeter shape defined by the predetermined shape of the housing; and
wherein the sensor pad is pliable and the base section of the housing is flexible, so as to enable the sensor pad to be readily removed from the base section in one unitary piece and placed in a desired location.

2. The product of claim 1 wherein the clamshell-type housing is of integral one piece construction, with a connector extending therebetween, and the base and cover sections foldable along the connector to move between the open and the closed positions.

3. The product of claim 1 wherein the clamshell-type housing has been formed by vacuum molding.

4. The product of claim 1 wherein the clamshell-type housing comprises one of polyvinyl chloride and recycled polyethylene terephthalate.

5. The product of claim 1 wherein the clamshell-type housing has an interior surface that defines the enclosed volume, and the interior surface includes a release agent to facilitate removal of the sensor pad therefrom.

6. The product of claim 1 wherein the sections of the clamshell-type housing include outer tabs to facilitate movement of the cover section with respect to the base section between the open and the closed positions.

7. The product of claim 1 wherein the sensor pad has been cured within the base section after the casting procedure, and before closing of the housing.

8. The product of claim 1 wherein the sensor pad comprises a silicone gel composition that is capable of being flowed, or cast, into the base section, and thereafter, able to cure therein within a short time window with a hardness of about 10 on a Shore A scale, such that after curing the sensor pad has sufficient internal cohesiveness to be removed from the base section as a unitary piece.

9. The product of claim 1 wherein the sensor pad is a rain sensor pad for a rain sensor system.

10. The product of claim 1, wherein there is an open space between the sensor pad and the cover section of the foldover clamshell-type housing, within the enclosed volume.

11. In combination, the invention comprising:
a sensor pad hazing a predetermined shape;
a foldover clamshell-type housing enclosing the pad within an enclosed volume thereof, the enclosed volume having a shape that is complementary to the particular shape of the sensor pad held therein; and
the foldover clamshell-type housing having two opposing sections that are foldable between an open position and a closed position, the sensor pad having been formed in situ, from a silicone gel composition, within the foldover clamshell-type housing when the housing was in an open position, and thereafter having been enclosed within the enclosed volume when the housing was folded to the closed position, with the housing in the closed position serving as the package for the formed in situ sensor pad.

12. The combination of claim 11 wherein the pad is a rain sensor pad adapted for use in a vehicle rain sensor system.

* * * * *